United States Patent
Yamada et al.

(10) Patent No.: US 7,725,916 B2
(45) Date of Patent: May 25, 2010

(54) SIGNAL SWITCHING DEVICE, SIGNAL DISTRIBUTION DEVICE, DISPLAY DEVICE, AND SIGNAL TRANSMISSION SYSTEM

(75) Inventors: Masazumi Yamada, Osaka (JP); Hiroyuki Iitsuka, Katano (JP)

(73) Assignee: Panasonic Corporation, Osaka (JP)

( * ) Notice: Subject to any disclaimer, the term of this patent is extended or adjusted under 35 U.S.C. 154(b) by 728 days.

(21) Appl. No.: 10/560,427

(22) PCT Filed: Jul. 12, 2004

(86) PCT No.: PCT/JP2004/010243
§ 371 (c)(1),
(2), (4) Date: Dec. 14, 2005

(87) PCT Pub. No.: WO2005/006740
PCT Pub. Date: Jan. 20, 2005

(65) Prior Publication Data
US 2006/0143679 A1 Jun. 29, 2006

(30) Foreign Application Priority Data
Jul. 14, 2003 (JP) ............................. 2003-196387

(51) Int. Cl.
*H04N 7/173* (2006.01)
*H04N 7/16* (2006.01)
(52) U.S. Cl. .................. 725/133; 725/141; 725/153
(58) Field of Classification Search .................. 725/80
See application file for complete search history.

(56) References Cited

U.S. PATENT DOCUMENTS

| | | | |
|---|---|---|---|
| 5,204,662 A * | 4/1993 | Oda et al. ............... | 340/825.25 |
| 5,563,886 A | 10/1996 | Kawamura et al. | |
| 5,666,363 A * | 9/1997 | Osakabe et al. ............... | 370/426 |
| 5,793,366 A * | 8/1998 | Mano et al. ................... | 715/839 |

(Continued)

FOREIGN PATENT DOCUMENTS

JP 07-131470 5/1995

(Continued)

OTHER PUBLICATIONS

"Digital Visual Interface DVI, Revision 1.0", Digital Display Working Group, Apr. 2, 1999, pp. 1-76.

(Continued)

*Primary Examiner*—Brian T Pendleton
*Assistant Examiner*—Ryan Stronczer
(74) *Attorney, Agent, or Firm*—Wenderoth, Lind & Ponack, L.L.P.

(57) ABSTRACT

A signal switching device including an interface having a video signal communicating unit, a DDC and an HPD, controlling connected device, or being controlled by connected device. A switcher (2) includes a switch (30) selecting video signal input, a DDC (26c) reading information from output destination device, a microcomputer (33) reading information indicating a physical address of switcher (2) and a status of the output destination device through DDC (26c), and a DDC (22a) and a DDC (22b) outputting information to a plurality of input source devices. The microcomputer (33) stores the physical address of the switcher (2) and abovementioned information into an EDID memory (32) and reads the above-mentioned information out of the EDID memory (32) and outputs through the DDC (22a) and the DDC (22b).

22 Claims, 9 Drawing Sheets

U.S. PATENT DOCUMENTS

| | | | | |
|---|---|---|---|---|
| 5,883,621 | A * | 3/1999 | Iwamura | 725/37 |
| 6,182,094 | B1 * | 1/2001 | Humpleman et al. | 715/234 |
| 6,546,419 | B1 * | 4/2003 | Humpleman et al. | 709/223 |
| 6,665,310 | B1 * | 12/2003 | Nakatsugawa | 370/442 |
| 6,943,753 | B2 | 9/2005 | Shirasaki et al. | |
| 6,976,267 | B1 * | 12/2005 | Takano et al. | 725/80 |
| 7,150,032 | B1 * | 12/2006 | Sadanaka et al. | 725/80 |
| 7,200,855 | B2 * | 4/2007 | Laksono | 725/82 |
| 7,360,235 | B2 * | 4/2008 | Davies et al. | 725/133 |
| 2001/0004257 | A1 | 6/2001 | Nitta et al. | |
| 2001/0014972 | A1 * | 8/2001 | Shepherd | 725/86 |
| 2001/0025376 | A1 * | 9/2001 | Knobl | 725/74 |
| 2001/0056579 | A1 * | 12/2001 | Kogane et al. | 725/105 |
| 2002/0089427 | A1 * | 7/2002 | Aratani et al. | 340/825.72 |
| 2003/0025685 | A1 | 2/2003 | Shirasaki et al. | |
| 2003/0066082 | A1 * | 4/2003 | Kliger et al. | 725/80 |
| 2004/0049797 | A1 * | 3/2004 | Salmonsen | 725/132 |
| 2004/0210630 | A1 * | 10/2004 | Simonnet et al. | 709/203 |

FOREIGN PATENT DOCUMENTS

| | | |
|---|---|---|
| JP | 07-235947 | 9/1995 |
| JP | 2001-175230 | 6/2001 |
| JP | 2003-029729 | 1/2003 |
| JP | 2004-015104 | 1/2004 |
| JP | 2004-120734 | 4/2004 |
| TW | 526420 | 4/2003 |

OTHER PUBLICATIONS

Notice of Allowance mailed Jan. 20, 2010 issued in corresponding Taiwanese patent Application No. 93120858 with English translation.

* cited by examiner

| | TV1 format | |
|---|---|---|
| | Resolution | Frequency |
| a1 | 640×480p | 60 Hz |
| a2 | 720×480p | 59.94/60 Hz |
| a3 | 1280×720p | 59.94/60 Hz |
| a4 | 1920×1080i | 59.94/60 Hz |

(B)

| | TV11 format | |
|---|---|---|
| | Resolution | Frequency |
| b1 | 720×480p | 59.94/60 Hz |
| b2 | 720×480i | 59.94/60 Hz |
| b3 | 1440×480i | 59.94/60 Hz |

SIGNAL SWITCHING DEVICE, SIGNAL DISTRIBUTION DEVICE, DISPLAY DEVICE, AND SIGNAL TRANSMISSION SYSTEM

TECHNICAL FIELD

The present invention relates to a signal switching device for switching a plurality of inputting signals, a signal distribution device for outputting the inputted signal to a plurality of devices, a display device for displaying video, and a signal transmission system.

BACKGROUND ART

In view of recent popularity of digital technology for digital video and communication satellite broadcasting, a system connecting digital devices using such a digital technology on a same network, and controlling the digital devices has been building up.

As one of a digital interface, Digital Visual Interface (DVI) is available. This interface includes a high speed signal transmission line which enables transmission of a digital video signal without compressing the signal, an Extended Display Identification Data (EDID) memory which holds information such as signal format being shown in the device at receiving side to provide to an upstream (signal source side), and a Display Data Channel (DDC) for reading out the information (for example referring to "Digital Visual Interface DVI, revision 1.0", 2.2 Plug and Play specification, [online], Apr. 2, 1999, Digital Display Working Group, [searched on Aug. 29, 2002], www.ddwg.org/downloads.html). Furthermore the DVI includes a Hot Plug Detect (HPD) line for giving a notice of the state that the information recorded in the EDID memory being readable, and the change of the content. The HPD line enables outputting of the information indicating the change of the content, only in the case where power is supplied from the device in upstream to a device with an HPD line.

A case is considered that a control line for controlling the connected device for the interface (DVI) is added. As an example, a case is considered that a control line used for a SCART connector (CENELEC, EN 50049-1:1997/A1:1998) used in Europe is added.

DISCLOSURE OF INVENTION

The control line composes a bus connected between an input and an output of all devices including a DVI. On the control line, a logical address, which is the information to define respective devices on a network set up by DVI, is defined. The logical address is determined as "STBb" and the like by making adjustment between the respective device types (DVD recorder/player, Set Top Box (STB), TV and so on) and the same type of devices. And then the address is held in the device including a DVI added control line.

In the header of a message transmitted through the control line, the logical address of a message sender and the logical address of a message receiver are included. The message includes a broadcast message in which the device including the DVI added all control lines is the receiver. The device including the DVI, in which the respective control lines are added, judges whether or not the broadcast message is the message to be processed by comparing the own logical address and the receiver in the header.

As mentioned above, by adding a control line to the DVI, an interface connecting a display device such as a TV and a recorder/player such as DVD recorder/player by a single cable can be realized.

However, only by combining the DVI and the control line, a certain device is unable to control another device. Especially in a system including a signal switching and distribution device such as switch and duplicator, a user desires that a certain device configuring the system is able to control another device. However, such a function has not been realized. It is not specified whether or not the device is under a controllable state, for example in different states such as the power of respective devices is on or off and the information stored in the EDID memory is readable or not.

Furthermore, it is specified that one route device exists in device control, and only one logical address to "TV" is specified. However, it is not specified about an operation of the certain device in a case where not less than two TVs (route devices) are connected to a certain device by failure or intentionally, and about a method to prevent from malfunctioning of the certain device.

Accordingly, only by combining the DVI and the control line, a certain device is unable to control another device connected to the certain device.

In view of above problem, an object of the present invention is to provide a signal switching device, a signal distribution device, and a display device, which include an interface having a video signal communicating unit, a DDC and an HPD that control the connected devices and are controlled by connected devices.

In order to solve the problem mentioned above and to achieve the purpose mentioned above, the signal switching device of the present invention includes: a selecting unit for selecting any one of a plurality of video signal inputs; a memory for storing information; a reading channel for reading the information out of an output destination device which is an output destination of a video signal; a reading unit for reading the information indicating a physical address of the signal switching device and a status of the output destination device through the reading channel; a storing unit for storing the information read by the reading unit into the memory; a read-out unit for reading out the information stored in the memory; a plurality of read-out channels for outputting the information to a plurality of input source devices which is an input source of a plurality of video signal inputs; and an outputting unit for outputting the information indicating the status of the output destination device through the read-out channel.

The signal distribution device of the present invention includes: a distributing unit for outputting a video signal to a part of or all of a plurality of output destination devices which are output destinations of a plurality of video signals; a memory for storing information; a plurality of reading channels for reading the information out of the plurality of output destination devices; a reading unit for reading the information indicating a physical address of the signal distribution device and a status of the output destination device through the reading channel; a storing unit for storing the information read by the reading unit into the memory; a read-out unit for reading out the information stored in the memory; a read-out channel for outputting the information to an input source device which is an input source of video signal; and an outputting unit for outputting the information indicating the status of output destination device through the read-out channel.

A display device of the present invention includes: a selecting unit for selecting any one of a plurality of videos; a display unit for displaying the video selected by the selecting unit; a memory for storing information indicating a physical address of an input source device which is an input source of video signal and a status of the display device; a read-out unit for reading out the information stored in the memory; a read-out channel for outputting the information to the input source device; and an outputting unit for outputting the information indicating the status of the display device through the read-out channel.

Accordingly, the signal switching device, the signal distribution device and the display device of the present invention include the memory and the read-out channel. In the respective memories, physical addresses of the respective devices, information indicating the status of device to be connected, and information indicating the status of the devices are stored, it is, therefore, possible to control the connected device, or to be controlled by the connected device.

Additionally, a signal transmission system of the present invention includes: a video signal transmission device; a video signal processing device; and a video signal receiving device. The video signal processing device has: a memory for storing information, a reading channel for reading the information from the video signal receiving device, a reading unit for reading the information indicating a physical address of the video signal processing device and a status of the video signal receiving device, a storing unit for storing the information read by the reading unit into the memory, a read-out unit for reading out the information stored in the memory, a read-out channel for outputting the information to the video signal transmission device, and an outputting unit for outputting the information indicating a status of the video signal receiving device through the read-out channel.

Accordingly the video signal processing device of the signal transmission system of the present invention includes the memory and the read-out channel, and the physical address of the video signal processing device and the information indicating the status of the video signal receiving device are stored into the memory. Therefore the video signal transmission device, the video signal processing device and the video signal receiving device are able to control or to be controlled mutually in the signal transmission system of the present invention.

In other words, according to the present invention, it is possible to control the device that transmits an uncompressed video signal by adding a control line to the DVI.

Also a switch and a duplicator and the like using the DVI can be realized.

Additionally, in the case where not less than two TVs are connected through the switch, the duplicator and the like, there is an effect that it is possible to control the connected devices within the area divided by the switch and the duplicator.

Furthermore the components which are characteristics of the signal switching device or the signal distribution device of the present invention, can be realized as steps of methods, and also as a program including these steps. The program can be distributed through recording media such as a CD-ROM and a transmission media such as a communication network.

DESCRIPTION OF DRAWINGS

FIG. 8A is a drawing showing a format of a video signal that the TV 1 is able to receive.

FIG. 8B is a drawing showing a format of the video signal that the TV 11 is able to receive.

DETAILED DESCRIPTION OF THE INVENTION

First Embodiment

Figure 1:
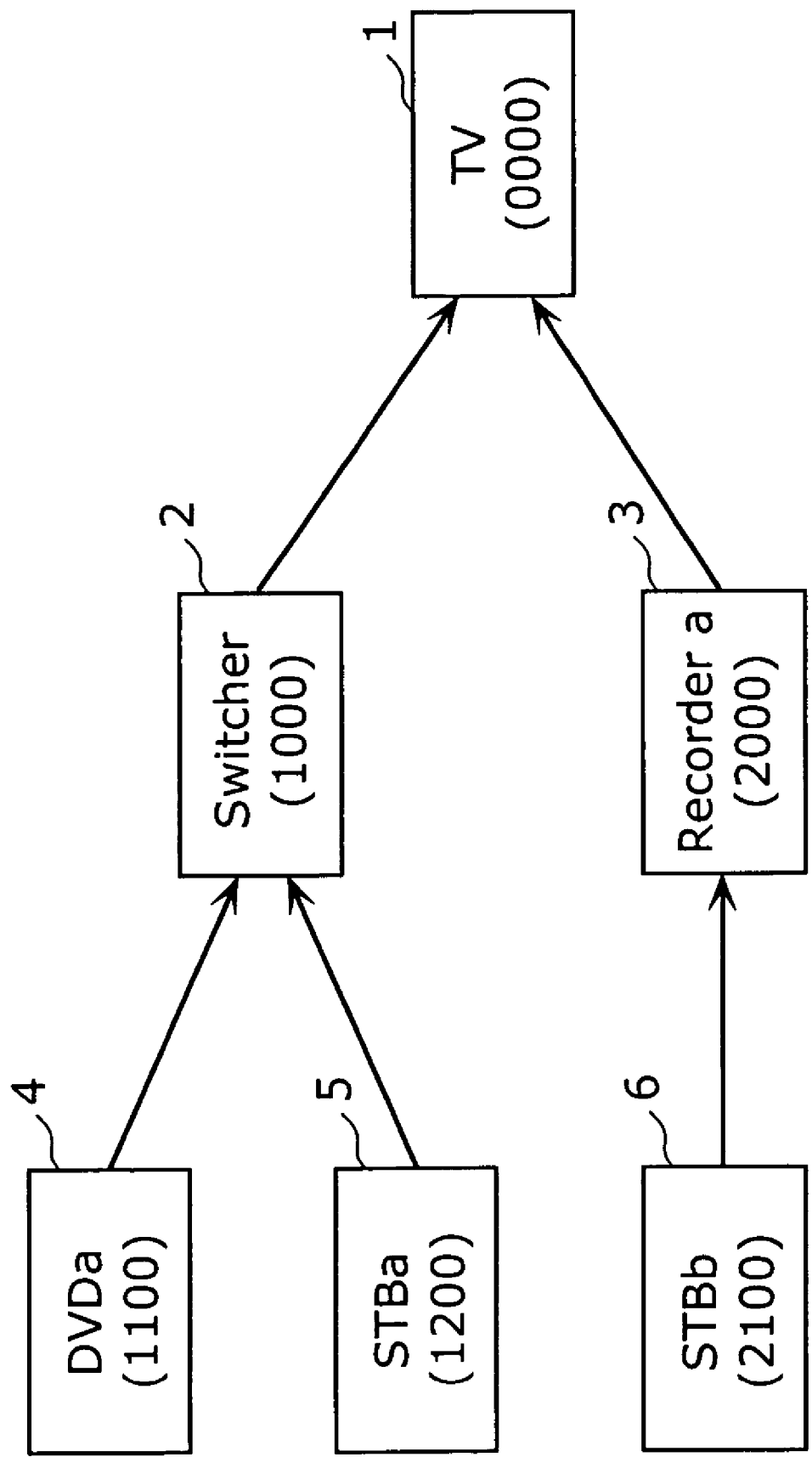
FIG. 1 is a block diagram showing a configuration of a signal transmission system including a switcher 2 of a first embodiment and a second embodiment.
Figure 2:
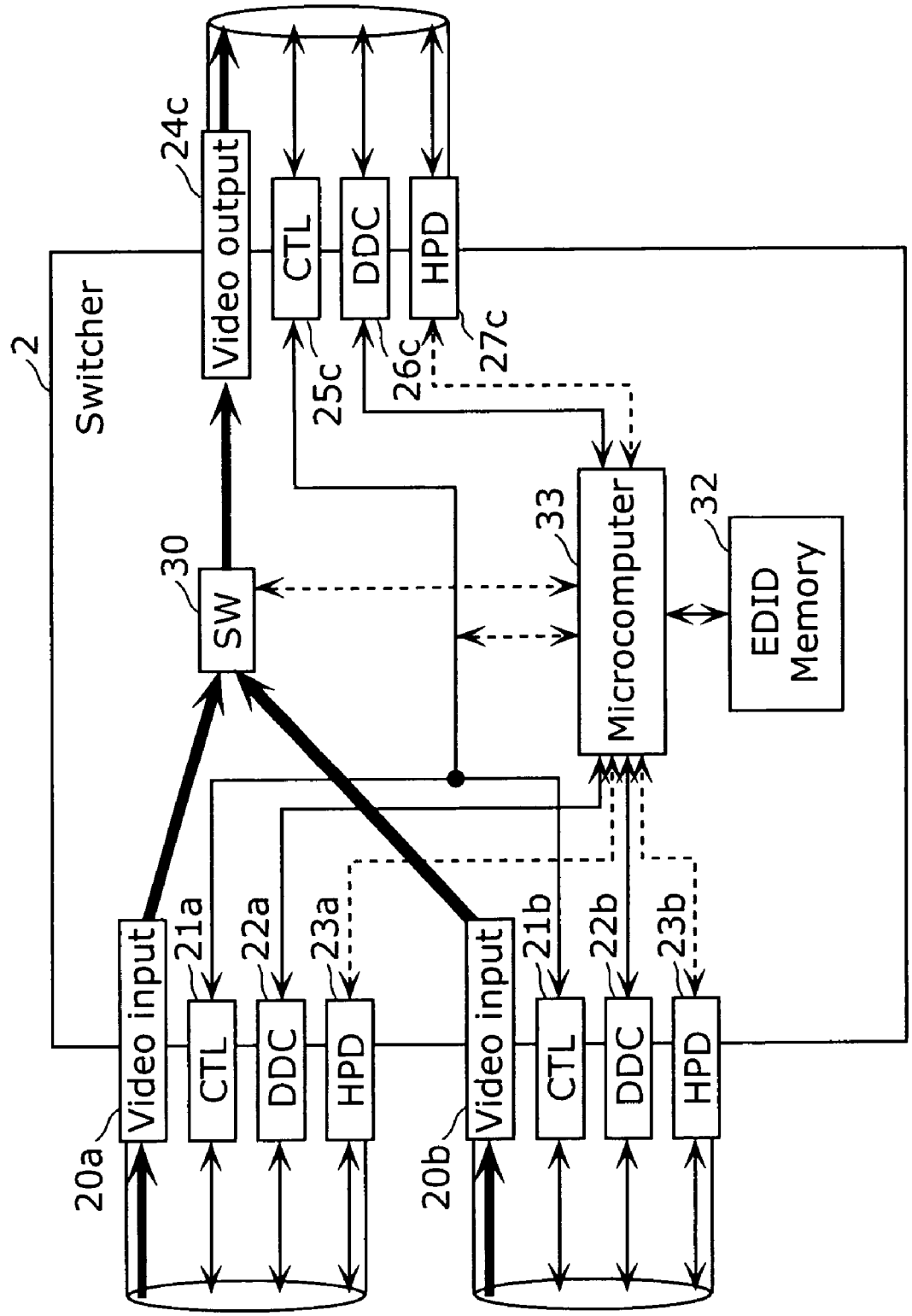
FIG. 2 is a drawing showing a configuration of switcher 2 of the first embodiment and the second embodiment.
Figure 3:
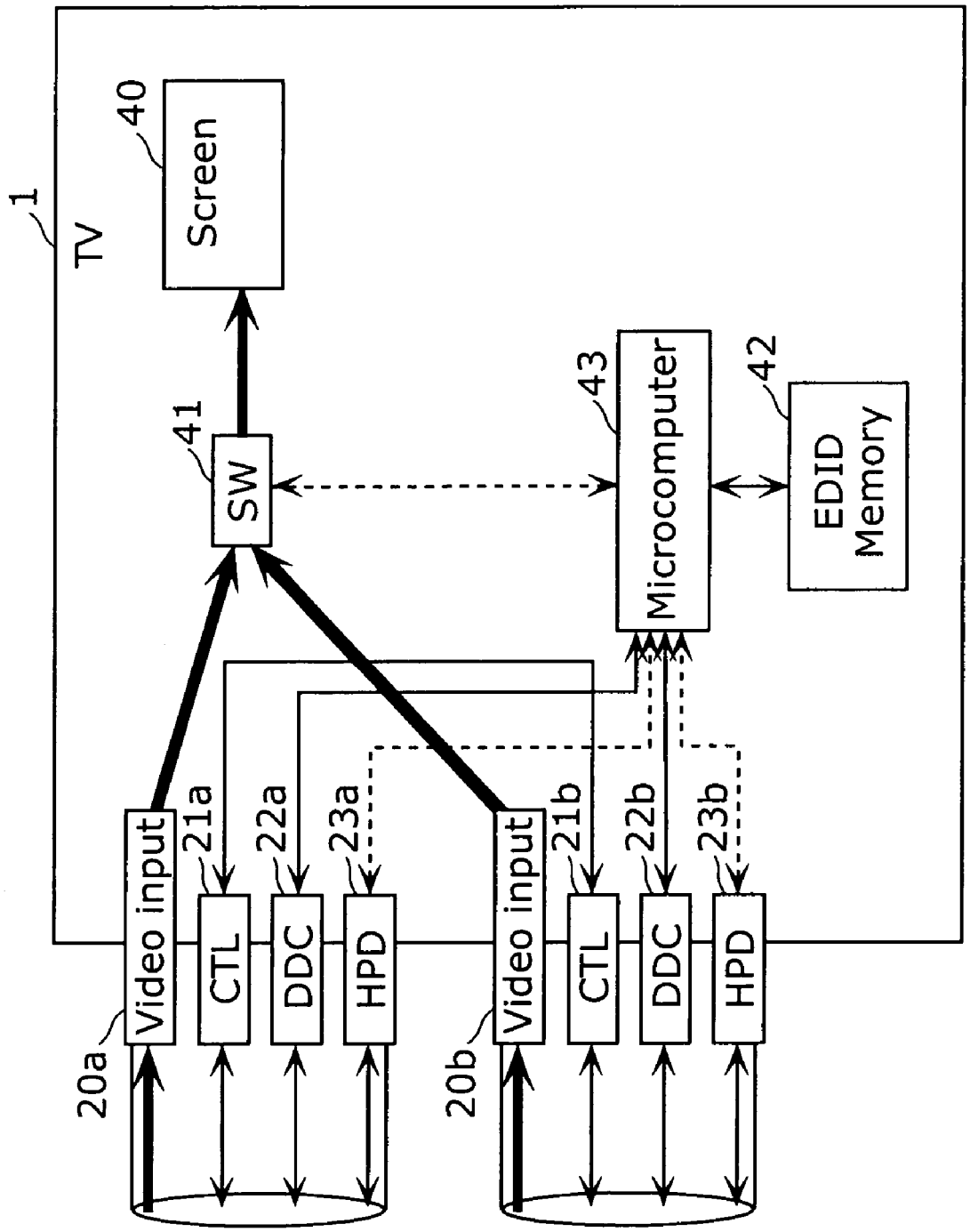
FIG. 3 is a drawing showing a configuration of TV 1 of the first embodiment and the second embodiment.

First, a configuration of a signal transmission system of the first embodiment is described using FIG. 1 to FIG. 3.

FIG. 1 is a block diagram showing a configuration of a signal transmission system of the first embodiment. As shown in FIG. 1, the signal transmission system of the first embodiment includes a TV 1, a switcher 2, a recorder a3, a DVD a4, a STB a5 and a STB a6. The switcher 2 and the recorder a3 are connected to TV 1, the DVD a4 and the STB a5 are connected to the switcher 2, and the STB b6 is connected to the recorder a3.

The TV 1 is a display device. The switcher 2 is a device for selecting either a video signal from the DVD a4 or a video signal from the STB a5. The recorder a3 is a device for recording a video signal from the STB b6. The DVD a4 is a device for reproducing the video signal recorded on a DVD. The STB a5 and the STB b6 are devices for receiving a video signal and outputting the video signal.

In FIG. 1, the notations are shown in each block indicating the TV 1, the switcher 2, the recorder a3, the DVD a4, the STB a5 and the STB a6 respectively. The notations represent the physical addresses of the devices indicated by the blocks with the notations.

The physical address is information specifying how the devices are connected each other (actually how control lines are connected). The physical address is held in the predetermined position of the EDID memory set up in the device at a receiver side, and is read out through the DDC at the time of start-up. Here the devices at the receiver side are the TV 1 for the TV 1 and the switcher 2, and the switcher 2 for the switcher 2 and the DVD a4. The device (for example the switcher 2) with the added DVI the control line generates physical addresses of the respective sub-devices (device connected to input side directly) from the own physical address, and holds the physical address with the own logical address.

The display device such as the TV is unable to read out the own physical address out of the device downstream, since the display device is a device at the final arriving point of the signal (route device). Therefore, when the power is turned on, the route device sets up a physical address, for example (0000) for itself and holds the address. In the case where two devices are connected to route device directly, the physical addresses of respective devices are determined as (1000) and (2000). In the case where three devices are connected to the device whose address is (1000), the physical addresses of respective devices are determined as (1100), (1200) and (1300) sequentially.

FIG. 1 shows a situation that the physical address of the TV 1 being a route device is (0000), and the physical addresses of the switcher 2 and the recorder a3 connected to the TV 1 directly are (1000) and (2000) respectively. And also FIG. 1 shows a situation that the DVD a4 and the STB a5 whose physical addresses being (1100) and (1200) respectively are connected directly to the switcher 2 whose physical address being (1000).

FIG. 2 is a drawing showing a configuration of the switcher 2 with two inputs and one output.

As shown in FIG. 2, the switcher 2 includes a video input unit 20a configuring the DVI at a first video input side (hereafter called as "the first input DVI"), a control line (CTL) 21a, a DDC 22a and a HPD 23a. And also the switcher 2 includes a video input unit 20b configuring the DVI at a second video input side (hereafter called as "the second input DVI"), a control line (CTL) 21b, a DDC 22b and a HPD 23b. The switcher 2 includes a video output unit 24c configuring the DVI at video output side, a control line (CTL) 25c, a DDC 26c and a HPD 27c.

Additionally, the switcher 2 includes a switch (SW) 30, an EDID memory 32 and a microcomputer 33.

The switch 30 selects either the video input unit 20a or the video input unit 20b. The EDID memory 32 is a memory for holding information, such as information indicating a status of the TV 1. The information indicating the status of the TV 1 is for example information indicating a format of video signal that the TV 1 is able to receive. And also as information indicating the status of TV 1, information related to products (type number, serial number, manufacturer and manufacture date year/month/date), information related to video format (pixel, gamma, color information such as R, G, and B), and information related to timing (number of samples, frame rate) are available. The EDID memory 32 also holds at least a physical address of the video input unit (the video input unit 20a or the video input unit 20 b) selected by the switch 30. The microcomputer 33 manages the status of switcher 2 based on the information being held in the EDID memory 32, and controls the switch 30, the control line 21a, the control line 21b and the control line 25c.

Here the DDC 22a and the DDC 22b are examples of read-out channels, and the DDC 26c is an example of a reading channel. The control line 21a, the control line 21b and the control line 25c are examples of control signal transmission line. A reading unit, a storage unit, a read-out unit, an output unit, a voltage detecting unit, a power status control unit, a power supply unit and an address setup unit are included in the microcomputer 33.

FIG. 3 is a drawing showing a configuration of the TV 1 with two inputs.

As shown in FIG. 3, the TV 1 includes a first input DVI and a second input DVI like the switcher 2. In other words, The TV 1 includes the video input unit 20a, the control line (CTL) 21a, the DDC 22a, and the HPD23a, and also the video input unit 20b, the control line (CTL) 21b, the DDC 22b and the HPD 23b. The TV 1 also includes a switch (SW) 41, an EDID memory 42, a microcomputer 43 and a screen 40. In FIG. 3, the same notations are used for the same components with the components shown in FIG. 2 and the explanation is not included.

The switch 41 selects either the video input unit 20a or the video input unit 20b. The EDID memory 42 is a memory for holding, for example the information indicating a status of the TV 1. The EDID memory 42 also holds at least the physical address of the video input unit (the video input unit 20a or the video input unit 20b) selected by the switch 41. The microcomputer 43 manages the status of the TV 1 based on the information being held in the EDID memory 42, and controls the switch 41. The screen 40 displays videos based on video signal from the video input unit (the video input unit 20a or the video input unit 20b) selected by the switch 41.

Next an operation of signal transmission system of the first embodiment is described.

It should be noted that in the following description, the operations of the TV 1, the switcher 2 and the DVD a4 are described using FIG. 4 to explain the operation of the switcher 2 in detail.

Figure 4:
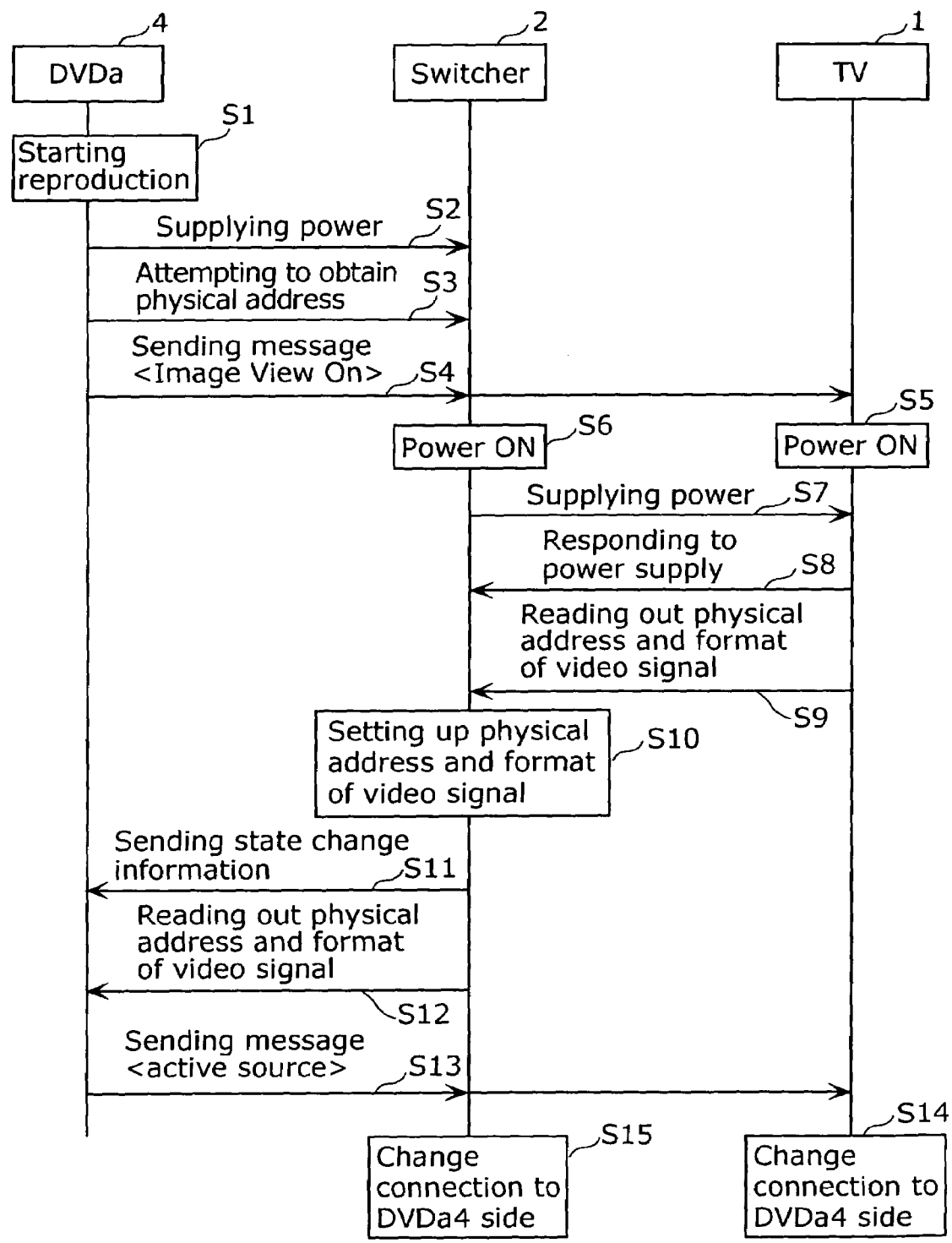
FIG. 4 is a sequence drawing describing each procedure of an operation for the signal transmission system of the first embodiment.

FIG. 4 is a sequence drawing to describe each procedure of an operation for the signal transmission system of the first embodiment.

First, suppose a status that the powers of all devices are off. In other words, suppose that powers of the TV 1, the switcher 2, the recorder a3, the DVD a4, the STB a5 and the STB b6 are off. Under this status, a user turns on the power of the DVD a4, and presses a PLAY button.

In this case, the DVD a4 starts reproduction (S1). Additionally the DVD a4 pulls up a control line and power is supplied to the switcher 2 through a power supply line (not illustrated), and supplies power with +5 voltages (S2). The DVD a4 also attempts to obtain the own physical address which is supposed to be held in the EDID memory 32 to the switcher 2 (S3). However as the power of devices other than the DVD a4 are not on yet, the DVD a4 is unable to obtain the own physical address from the device (the switcher 2) downstream yet. The DVD a4, therefore, keeps reading the own physical address through the DDC 22a until the DVD a4 gets the own physical address.

The DVD a4 sends a message <Image View On> through the control line 21a to the TV 1 (S4). The DVD a4 sets up the own logical address into the parameter of the message sender, and sets up the logical address of the TV 1 into the parameter of the receiver. The control line 21a, the control line 21b and the control line 25c of the switcher 2 are connected each other, so that the message from the DVD a4 can be reached to the TV 1 as far as a device pulling up a control line is available (S4).

In the TV 1, the microcomputer 43 receives the message <Image View On> through the control line 21a, and then turns on the power of the TV 1 (S5), so that the video can be shown.

In the switcher 2, the microcomputer 33 detects a pull-up of the control line, and then turns on the power of the switcher 2 (S6). Alternatively the microcomputer 33 may turn on the power of the switcher 2 when a message is on the control line (S6).

Next the microcomputer 33 of the switcher 2 supplies power with +5 voltages to the TV 1 (S7). In the TV 1, the microcomputer 43 detects that power with +5 voltages is supplied to the TV 1, and then outputs the information indicating the supply of power (responding to power supply) through the HPD23a (S8). The physical address of the TV 1 (0000) and the physical addresses of the sub-devices (1000) and (2000) are set up in the EDID memory 42 of the TV 1.

In the switcher 2, the microcomputer 33 detects that the information indicating that the power with +5 voltage being supplied to the TV 1 (responding to power supply) is outputted from HPD 23a of TV 1, and then reads the physical address of the switcher 2 (1000) out of the TV 1 through the DDC 26c, and then sets up the address in the EDID memory 32 (S9). At the same time, the microcomputer 33 reads out the format of a video signal that the TV 1 is able to receive, and then registers the format in the EDID memory 32. The format of the video signal includes a resolution and a frequency of the video signal that the TV 1 is able to receive. It should be noted that in the case where the switcher 2 reads out the physical address of the switcher 2 and the format of the video signal that the TV 1 is able to receive from the TV 1, the microcomputer 43 of the TV 1 reads out the above-mentioned physical address and format from the EDID memory 42 and outputs to the switcher 2 through the DDC 22a.

The microcomputer 33 also sets up the physical addresses of the sub-devices of the switcher 2 (1100) and (1200) into the EDID memory 32 (S10). Further the microcomputer 33 outputs the information indicating a change of the content of the information held in the EDID memory 32 from the HPD 23a (S11).

In the case where the DVD a4 detects that the information indicating a change of the content of the information held in the EDID memory 32 of the switcher 2, the physical address of the DVD a4 (1100) is read out of the switcher 2 through the DDC 22a, and then sets up in its own memory (S12). At the same time, the DVD a4 reads out the format of video signal that the TV 1 receives from the switcher 2, and sets up the format in its own memory (S12). The DVD a4 reflects the format set up in the memory in setting up of video signal to be outputted. It should be noted that at the time that the DVD a4 reads out the physical address of the DVD a4 and the format of video signal that the TV 1 is able to receive from the switcher 2, the microcomputer 33 of the switcher 2 reads the above-mentioned physical address and the format out of the EDID memory 32, and outputs the address and the format to the DVD a4 through the DDC 22a.

The DVD a4 broadcasts a message <active source> through the control line 21a (S13). The message includes the physical address of the DVD a4 (1100). In the TV 1, the microcomputer 43 receives a message <active source> from the control line 21a, and then changes the internal connection to the DVD a4 side (S14). In other words, the microcomputer 43 has control of the switch 30 to select the video input unit 20a (S14).

In the switcher 2, the microcomputer 33 receives the message <active source> from the control line 21a, and then compares the physical address (1100) in the message and the physical address of the switcher 2 (1000) set up in the EDID memory 32. At this time, the microcomputer 33 watches the second digit (hundreds place) from the beginning of the two physical addresses, and then changes the internal connection to the DVD a4 side (S15). In other words the microcomputer 33 controls the switch 30 so that the switch 30 selects the video input unit 20a (S15). Accordingly the microcomputer 33 is able to perform the control specified by the message properly by using the message and the physical address specified by the message.

In this way, the video signal line from the DVD a4 to the TV 1 is built up, the TV 1 receives a video signal from the DVD a4 and then shows the video based on the video signal.

In the above-mentioned first embodiment, a user turns on the DVD a4 and presses the PLAY button, so that the DVD a4 sends the message <Image View On> to the switcher 2 and the TV 1. Accordingly the power of the switcher 2 and the TV 1 are turned on without user's operation. Afterward the DVD a4 sends the message <active source> to the switcher 2 and the TV 1. Accordingly the respective switches of the switcher 2 and the TV 1 select the DVD a4 side without user's operation. As a result, the user turns on the DVD a4 and presses the PLAY button, so that the video signal line from the DVD a4 to the TV 1 are built up.

Thus the device, which sends out a message through a control line, pulls up the control line, as a result it is possible for the device to put the other device in a status that a message can be received automatically, and also to put in a status that the EDID is readable and to turn on the power.

In fact in the first embodiment, by using a message and a physical address specified by the message, the control specified by the message can be performed properly.

It should be noted that in the first embodiment, in the case where the DVD a4 pulls up a control line and supplies the switcher 2 with power through a power supply line, power of the switcher 2 is turned on. On the contrary, in the case where the voltage of a control line is decreased to ground voltage, the power of the switcher 2 may be off.

Besides, in the above-mentioned first embodiment, the microcomputer 33 of the switcher 2 receives the message <Image View On> from the DVD a4, and then supplies power to the TV 1. Alternatively the microcomputer 33 receives other messages from the DVD a4, and then may supply power to the TV 1. Additionally in the case where the control line 21a, the control line 21b or the control line 25c are not used, the microcomputer 33 may stop supplying power to the control line 21a, the control line 21b and the control line 25c. Accordingly the microcomputer 33 controls the power supply to all of or part of the control line 21a, the control line 21b and the control line 25c depending on whether or not the control line 21a, the control line 21b and the control line 25c are used.

Second Embodiment

Figure 5:
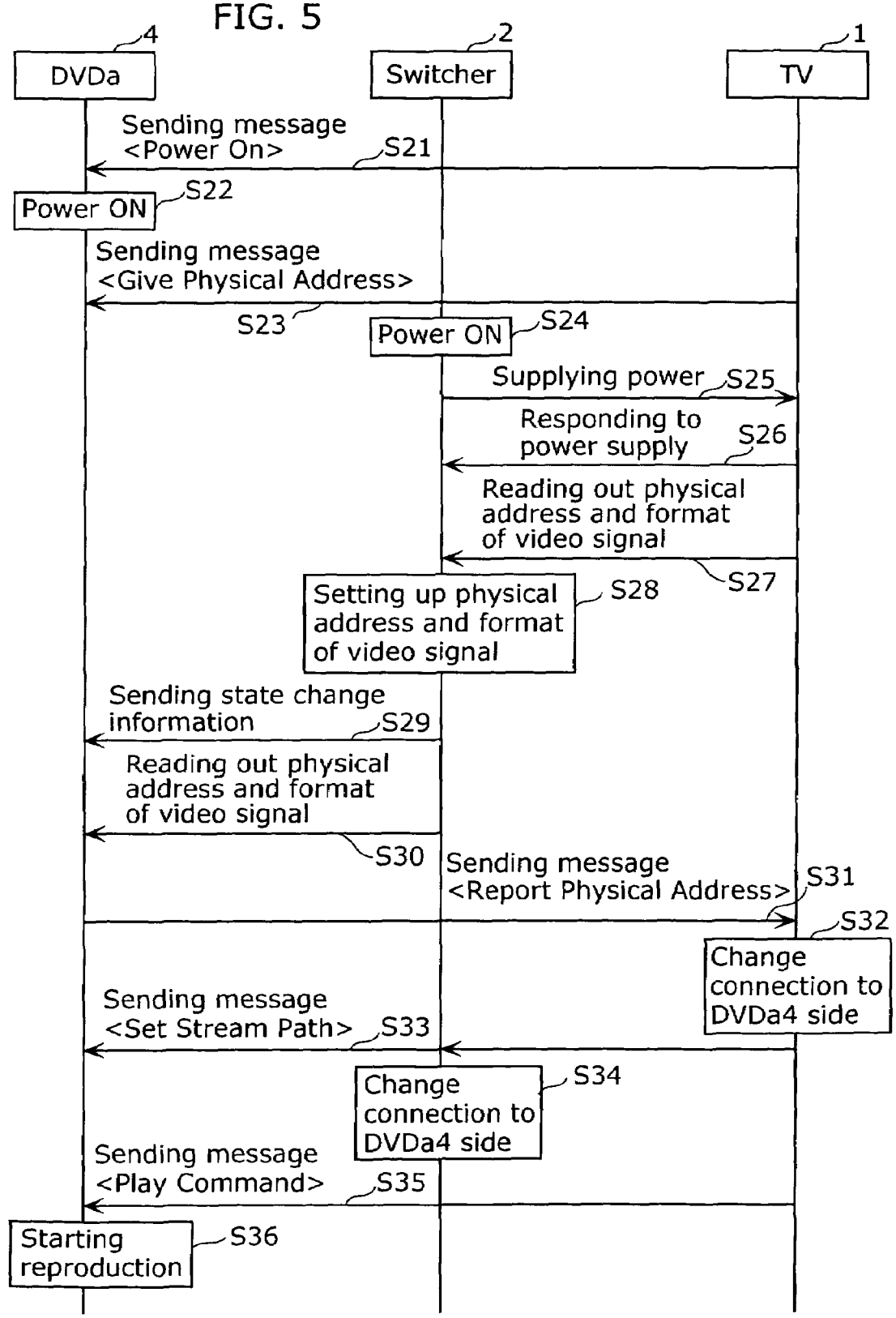
FIG. 5 is a sequence drawing describing each procedure of an operation for the signal transmission system of the second embodiment.

In this embodiment, it is described that the control performed in the first embodiment is performed from the TV 1 side according to FIG. 5. The configuration of the signal transmission system of the second embodiment is the same as the configuration of the signal transmission system of the first embodiment.

FIG. 5 is a sequence drawing to describe each procedure of an operation for the signal transmission system of the second embodiment.

Suppose that from a state that power of all devices are off, the user turns on the power of the TV 1. The TV 1 is a route device, and the own physical address (0000) and the physical addresses of the sub-devices (1000) and (2000) are set up in the EDID memory 42 in advance. The user changes the input by operation using a GUI or a remote controller of the TV 1, and selects the DVD a4.

The TV 1 pulls up a control line, and sends a message <Power ON> to the DVD a4 through the control line 21a and the control line 21b (S21). The TV 1 sets up the own logical address into a parameter of the message sender, and also the logical address of the DVD a4 into a parameter of the message receiver.

The DVD a4 detects the message <Power ON>, and then the power is turned on (S22). Since the physical address of other devices might have been changed while the power of the TV 1 is off, the TV 1 confirms the physical address of the DVD a4 using a message <Give Physical Address> (S23). In fact the TV 1 broadcasts the message <Give Physical Address> (S23).

In the switcher 2, the microcomputer 33 detects a pull up of a control line, and then turns on the power of the switcher 2 (S24). Alternatively the microcomputer 33 may turn on the power of the switcher 2 when the message is on the control line. In the switcher 2, the microcomputer 33 turns on the power, and supplies power with +5 voltage to the TV 1 (S25). In the TV 1, the microcomputer 43 detects power supply of +5 voltage, and then outputs the information (responding to power supply) indicating the change of the content of the TV 1 from the HPD 23a (S26).

In the switcher 2, the microcomputer 33 detects that the information (responding to power supply) indicating the change of the content of the TV 1 from the HPD 23a is outputted, and then reads the physical address of the switcher 2 (1000) out of the TV 1 through the DDC 22a (S27). Additionally the microcomputer 33 reads out a format of a video signal that the TV 1 is able to receive (S27). The microcomputer 33 sets up the read-out physical address of the switcher 2 (1000) into the EDID memory 32 (S28). The microcomputer 33 also sets up the physical addresses of the sub-devices (1100) and (1200) into the EDID memory 32 (S28). Further the microcomputer 33 sets up a format of a video signal that the TV 1 is able to receive into the EDID memory 32 (S28). The microcomputer 33 outputs the information indicating the change of the information set up in the EDID memory 32 out of the HPD 23*a* and the HPD 23*b* (S29).

The DVD a4 reads the own physical address (1100) out of the switcher 2 through the DDC 22*a*, and sets up in a memory equipped in the DVD a4 (S30). The DVD a4 responds to the message <Give Physical Address> from the TV 1 using a message <Report Physical Address> (S31). The DVD a4 sets up the own logical address in a parameter of the message sender, and sets up the logical address of the TV 1 in a parameter of a receiver.

In the TV 1, the microcomputer 43 changes the switch 41 so that the switch 41 selects the DVD a4 side (S32), and then broadcasts a message <Set Stream Path> from the control line 21*a* and the control line 21*b* (S33). In the switcher 2, the microcomputer 33 receives a message <Set Stream Path> from a control line, and then changes the switch 30 to DVD a4 side (S34). As a result the video signal line from the DVD a4 to the TV 1 is built up.

In the TV 1, the microcomputer 43 sends a message <PlayCommand> to the DVD a4 through a control line (S35). The DVD a4 starts reproduction according to the format of the video signal received by the TV 1 (S36). The TV 1 receives the signal from the DVD a4 and displays.

As described hereinbefore, a user operates the TV 1 so that the TV 1 selects the DVD a4, thus the TV 1 pulls up a control line, and then sends the message <Power ON> to the DVD a4. As a result the powers of the switcher 2 and the DVD a4 are turned on without user's operation. Afterward the TV 1 broadcasts a message <Set Stream Path>. In the switcher 2, the microcomputer 33 changes the switch 30 to the DVD a4 side based on the message. As a result the video signal line from the DVD a4 to the TV 1 is built up without user's operation of the switcher 2 and the DVD a4.

In fact, as the first embodiment, the device, which sends out a message through a control line, pulls up the control line, as a result it is possible for the device to put the other device in a status that a message can be received automatically, and also to put in a status that the EDID is readable and to turn on the power. And also by using a message and a physical address specified by the message, the control (building up a signal line here) specified by the message can be performed properly.

On the contrary, in the case where the powers of both the DV 1 and the DVD a4 are off, the status is changed to indicate that a message is not sent to a control line, thereby the device which pulls up the control line is not available. The microcomputer 33 of the switcher 2 detects that the control line 21*a* and the control line 21*b* are returned to GND level, and turns off power of the switcher 2. Accordingly, in the case where power of all devices other than specified device are turned off, an application which turns off the power of specified device can be realized.

Third Embodiment

Figure 6:
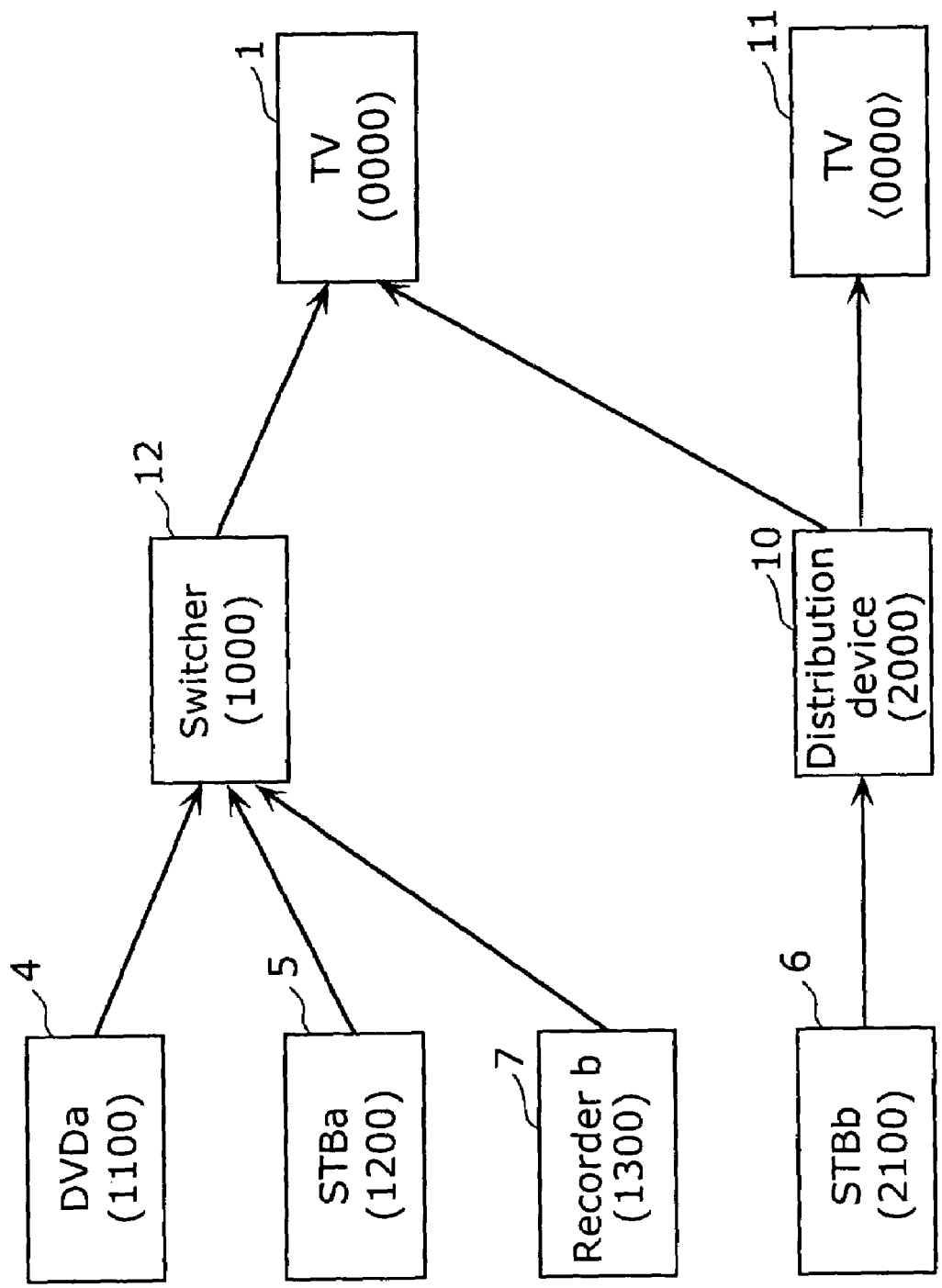
FIG. 6 is a block diagram showing a configuration of the signal transmission system including a distribution device 10 of a third embodiment.
Figure 7:
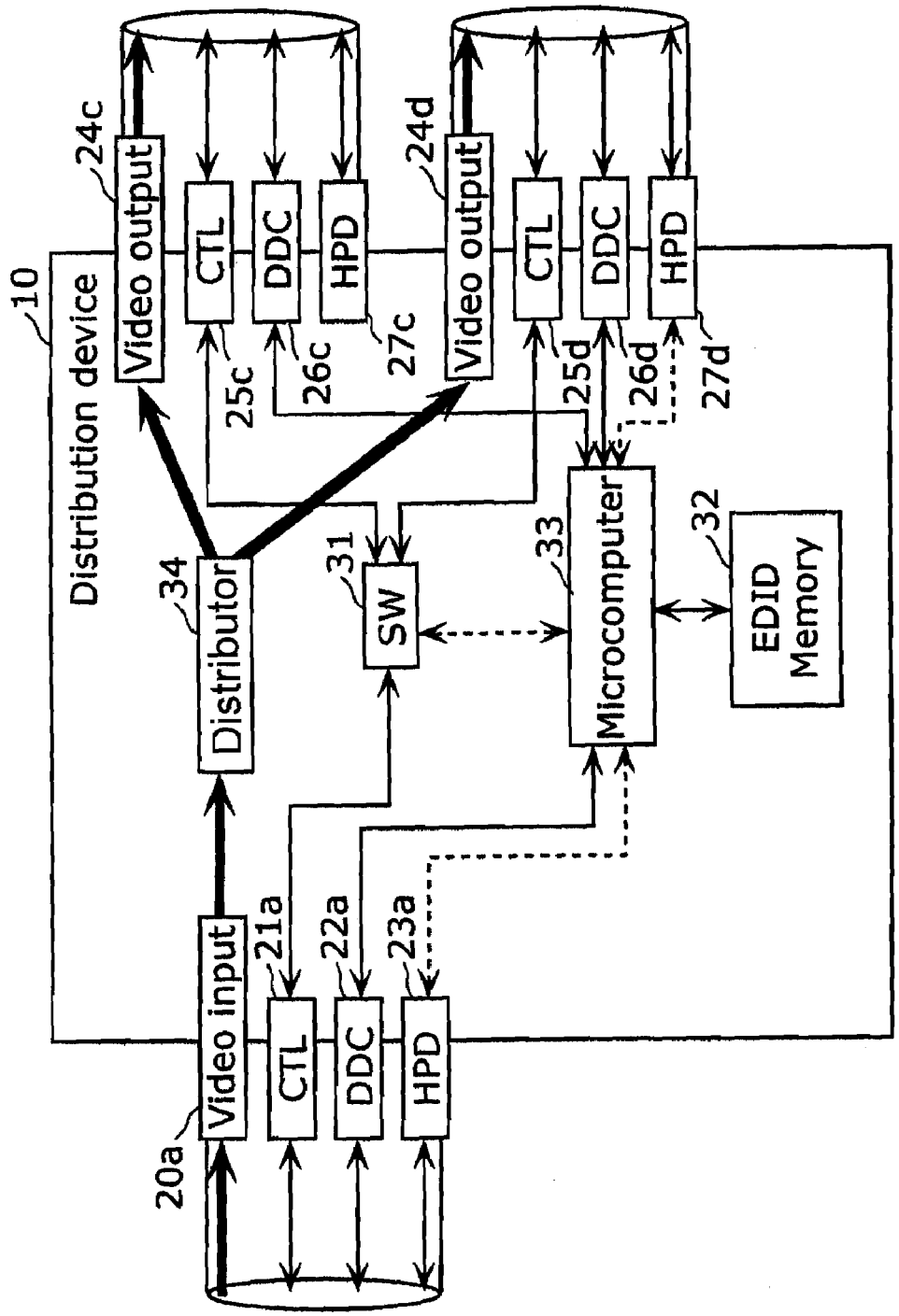
FIG. 7 is a drawing showing a configuration of distribution device 10 of the third embodiment.

Next, the signal transmission system of the third embodiment is described using FIG. 6 to FIG. 8.

FIG. 6 is a block diagram showing a configuration of the signal transmission system of the third embodiment. As shown in FIG. 6 the signal transmission system of the third embodiment includes the TV 1, a TV 11, a switcher 12, a distribution device 10, the DVD a4, the STB a5, a recorder b7, and the STB b6. The DVD a4, the STB a5 and the recorder b7 are connected to the switcher 12, a video based on a signal selected by the switcher 12 is shown on the TV 1. And also the signal outputted from the STB b6 is sent to the TV 1 and the TV 11 by the distribution device 10.

In FIG. 6, the same notations are used for the same components with the components shown in FIG. 1 and the explanation is not included. The TV 11 is a display device. The switcher 12 is the same type of device as the switcher 2. The distribution device 10 is a device for outputting signal from the STB b6 to the TV 1 and/or the TV 11. The recorder b7 is the same type of device as the recorder a3.

In FIG. 6, the notations indicating each device are shown in each block. The notations represent physical addresses of the devices indicated by the blocks with notations.

FIG. 7 is a drawing showing a configuration of the distribution device 10 with one input and two outputs. In FIG. 7, the same notations are used for the same components with the components shown in FIG. 2 and the explanation is not included. In FIG. 7, a distributor 34 distributes a video signal from the video input unit 20*a* to a video output unit 24*c* and a video output unit 24*d*, a switch 31 changes the control line (CTL) 25*c* and a control line (CTL) 25*d* which are control signal transmission lines. One of the two outputs for the DVI includes the video output unit 24*d*, the control line 25*d*, a DDC 26*d* which is a reading channel and a HPD 27*d*.

As shown in FIG. 6, in the case where the distribution device 10 is available, it is possible to connect plurality of devices including both the TV 1 and the TV 11. However under the rule of a control line in the SCART, only one device having a logical address of a TV on a bus is allowed to exist. Further there is no rule to indicate for either the TV 1 or the TV 11, that the physical address of the distribution device 10 is obtainable. In a case where the physical address is obtained from both the TV 1 and the TV 11, different values are obtained incompatibly, or the physical addresses of the distribution device 10 and devices upstream are changed at every control, as a result a problem that proper control cannot be performed is caused.

As a countermeasure, the distribution device 10 is equipped with the switch 31 for internal connection of the control line, which receives control from the microcomputer 33, and selects either the TV 1 or the TV 11. In this way, the control line is connected to either one of the TVs at one time, and this can prevent from not conforming to a logical address rule. Further, the microcomputer 33 regulates not to read a physical address from the DDC at not-selecting side. For example when the microcomputer 33 of the distribution device 10 selects the TV 11, the switch 31 connects the control line 25*d* and the control line 21*a*, and the control line 25*c* and the control line 21*a* are not connected. And also the microcomputer 33 reads the physical address of the distribution device 10 out only of the DDC 26*d*, and not to read out of the DDC 26*c*. And then the microcomputer 33 sets up the physical address of the distribution device 10 read out of the DDC 26*d* into the EDID memory 32. As a result, incompatibility on the physical address can be prevented.

Besides, as the first embodiment, in the distribution device 10, the microcomputer 33 detects a pull-up of the control line, and then turns on the power of the device. Alternatively the microcomputer 33 may turn on the power of the device when a message is sent. Thus, by pulling up a control line, the distribution device 10 is put in a status that a message can be received automatically, or put in a status that EDID is readable.

Further, the microcomputer 33 of the distribution device 10 detects that the control line 21a, the control line 25c and the control line 25d returned to GND level, and then turns off the power of the device. Accordingly, in the case where the power of all devices other than specified device are turned off, an application which turns off the power of specified device can be realized. The transmission of a physical address and the response to a message are the same as the first embodiment and the second embodiment.

As shown in FIG. 6, in the case where the distribution device 10 selects the TV 11 side, that is the video outputting unit 24d side, the TV 1 (physical address=0000), the switcher 12 (1000), the distribution device 10 (2000), the DVD a4 (1100), the STB a5 (1200), the recorder b7 (1300) and the STB b6 (2100) are connected to a bus. The TV 11 is able to receive and to reproduce a signal, but is not able to control other devices by sending a message, and is not able to make signal source side adjust the format by offering a video format to which TV 11 is able to correspond.

On the other hand, in a different case from the case shown in FIG. 6, in the case where the input change of the TV 1 selects the switcher 12 side, that being the video input unit 20a side, and also the distribution device 10 selects the TV 11 side, that being the video output side 24d, the TV 1 (0000), the switcher 12 (1000), the DVD a4 (1100), the STB a5 (1200) and the recorder b7 (1300) are connected to the first bus. Further the TV 11 (0000), the distribution device 10 (1000) and the STB b6 (2100) are connected to the second bus. In this case, the TV 1 and the TV 11 can be route devices individually, and it is possible to send and receive a message and to make signal source side adjust the format.

Here, suppose that a case where plurality of formats of video signals that the TV 1 being able to receive, and plurality of formats of video signals that the TV 11 being able to receive are available. FIG. 8A shows a format of video signals that the TV 1 is able to receive and FIG. 8B shows a format of video signals which the TV 11 is able to receive. As shown in FIG. 8A, the format of the video signals that the TV 1 is able to receive are four, (a1) to (a4). On the contrary as shown in FIG. 8B, the format of the video signals that the TV 11 is able to receive are three, (b1) to (b3). The format shown in (a2) and the format shown in (b1) are common. On this account, the microcomputer 33 of the distribution device 10 sends a message to the STB b6 to output video signal with the common format shown in (a2) and (b1). According to the message, the STB b6 outputs video signal with the format shown in (a2) and (b1). Accordingly, the TV 1 and the TV 11 are able to receive the video signal from the STB b6.

It should be noted that in the case where there are plurality of formats of the video signal that the TV 1 is able to receive and also the TV 11 is able to receive, the microcomputer 33 of the distribution device 10 may send a message indicating that plurality of formats exist to the STB b6. The STB b6 selects either one of the plurality of formats. At this time, setting rules such as selecting video signal with the highest resolution, and then the STB b6 may select either one out of plurality of formats based on the rule.

Figure 9:
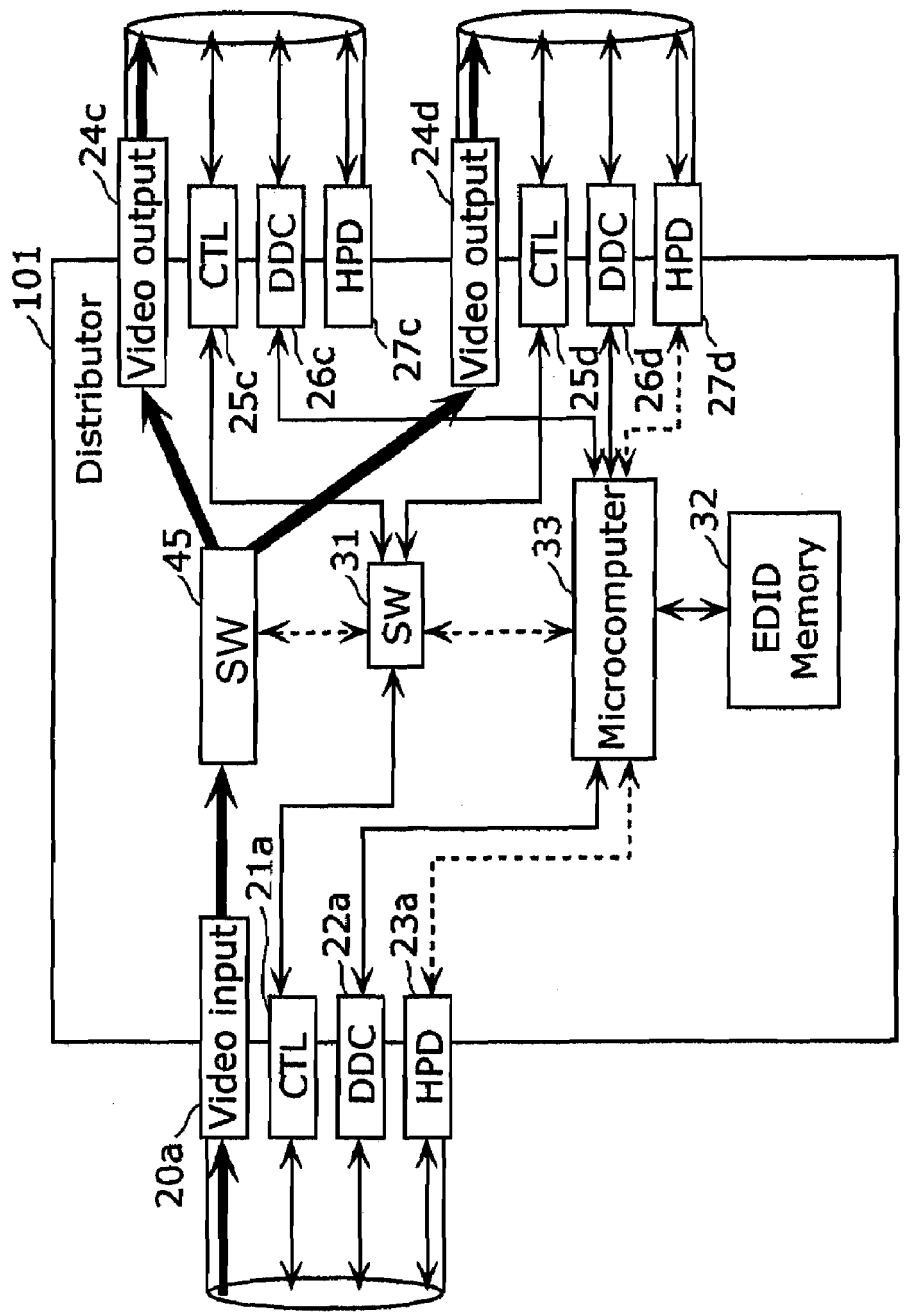
FIG. 9 is a drawing showing a configuration of a distributor.

Besides, the distribution device 10 may be replaced by a distributor 101 equipped with a switch 45 for executing internal connection of video output as shown in FIG. 9. In this case according to the selection by the microcomputer 33, changing of the video signal by the switch 45 and changing of the control line by the switch 31 are interlocked, it is, therefore, possible to control for the device which selects and distributes a video signal.

It should be noted that in each embodiment, all of or part of the functions of each component or all of or part of each step explained above can be realized using a recording medium for storing program to be executed by a computer.

Furthermore, in the above-mentioned embodiment, the signal switching device of the present invention is exemplified using the switcher 2 with two inputs and one output, and the signal distribution device of the present invention is exemplified using the distribution device 10 with one input and two outputs. However, the present invention is not limited to these examples, the signal switching device and the signal distribution device of the present invention may have not less than two inputs and outputs.

Further in the above-mentioned embodiments, in the signal transmission system of the present invention, the DVD a4 and the STB a6 are used as examples of a video signal transmission device. And also as examples of video signal processing device, the switcher 2 and the distribution device 10 are used, while as an example of a video signal receiving device, the TV 1 and the TV 11 are used.

A signal switching device, a signal distribution device and a display device of the present invention are practical as devices controlling device connected through an interface of DVI and so on having a video signal communicating unit, a DDC and an HPD.

The invention claimed is:

1. A signal switching device comprising:
a selecting unit operable to select a video signal from a plurality of video signal inputs, each video signal input being transmitted from an input source device of a plurality of input source devices;
a memory for storing information;
a reading channel for reading the information from an output destination device that is an output destination of the video signal;
a reading unit operable to read the information through said reading channel, the information (i) indicating a physical address of said signal switching device, the physical address of said signal switching device being generated by the output destination device and including information indicating a physical address of the output destination device, and (ii) indicating a status of the output destination device;
a storing unit operable to store the information read by said reading unit into said memory;
a read-out unit operable to read out the information stored in said memory;
a plurality of read-out channels for outputting the information to the plurality of input source devices, each read-out channel of said plurality of read-out channels corresponding to a respective input source device of the plurality of input source devices;
an outputting unit operable to output the information indicating the status of the output destination device (i) through a read-out channel, of said plurality of read-out channels, that corresponds to the input source device transmitting the video signal selected by said selecting unit and (ii) to the input source device transmitting the video signal selected by said selecting unit; and
an address setup unit operable to generate a respective physical address of each input source device of the plurality of input source devices, each respective physical address including information indicating the physical address of said signal switching device,
wherein said outputting unit is operable to output, to each respective input source device of the plurality of input source devices, the respective physical address of the input source device including the information indicating the physical address of said signal switching device generated by said address setup unit such that each respective physical address corresponds to an input source device of the plurality of input source devices.

2. The signal switching device according to claim 1, wherein said outputting unit is operable to output the information indicating the status of the output destination device only through said read-out channel that corresponds to the video signal selected by said selecting unit.

3. The signal switching device according to claim 2 wherein said selecting unit is operable to select a video signal that corresponds to the physical address of an input source device of the plurality of input source devices.

4. The signal switching device according to claim 1 further comprising:
 a plurality of control signal transmission lines for transmitting a device control signal between the output destination device and the respective input source devices;
 a voltage detecting unit operable to detect a voltage status of each control signal transmission of said plurality of control signal transmission lines; and
 a power status control unit operable to change a status of a power supply of said signal switching device depending on the detected voltage status obtained by said voltage detecting unit.

5. The signal switching device according to claim 4, wherein said power status control unit is operable to turn on the power supply of said signal switching device when a pull-up of a control signal transmission line of said plurality of control signal transmission lines is detected by said voltage detecting unit.

6. The signal switching device according to claim 4, wherein said power status control unit is operable to turn off the power supply of said signal switching device when the detected voltage status of a control signal transmission line of said plurality of control signal transmission lines is decreased to a ground voltage.

7. The signal switching device according to claim 1 further comprising:
 a plurality of control signal transmission lines for transmitting a device control signal between the output destination device and the respective input source devices; and
 a power supply control unit operable to control a power supply to all of or part of the output destination device and the respective input source devices depending on whether or not each respective control signal transmission line of said plurality of control signal transmission lines is used.

8. The signal switching device according to claim 7, wherein said power supply control unit is operable to supply power when a message, being the device control signal, is transmitted to a respective control signal transmission line.

9. The signal switching device according to claim 7, wherein said power supply control unit is operable to stop a power supply when a respective control signal transmission line is not used.

10. A signal switching method comprising:
 a selecting step of selecting a video signal from a plurality of video signal inputs, each video signal input being transmitted from an input source device of a plurality of input source devices;
 a reading step of reading information through a reading channel, the information (i) indicating a physical address of a signal switching device, the physical address of the signal switching device being generated by an output destination device and including information indicating a physical address of the output destination device, and (ii) indicating a status of the output destination device that is an output destination of the video signal, and the reading channel being for reading the information from the output destination device;
 a storing step of storing the information read in said reading step into a memory;
 a read-out step of reading out the information stored in the memory;
 an outputting step of outputting the information indicating the status of the output destination device (i) through a read-out channel of a plurality of read-out channels for outputting the information to the plurality of input source devices, each read-out channel of the plurality of read-out channels corresponding to a respective input source device of the plurality of input source devices, the read-out channel through which the information is output corresponding to the input source device transmitting the video signal selected by said selecting step, and (ii) to the input source device transmitting the video signal selected by said selecting step; and
 an address generating step of generating a respective physical address of each input source device of the plurality of input source devices, each respective physical address including information indicating the physical address of the signal switching device,
 wherein said outputting step includes outputting, to each respective input source device of the plurality of input source devices, the respective physical address of the input source device including the information indicating the physical address of the signal switching device generated by said address generating step, such that each respective physical address corresponds to an input source device of the plurality of input source devices.

11. A computer-readable recording medium having a program recorded thereon, the program causing a computer to execute a method comprising:
 a selecting step of selecting a video signal from a plurality of video signal inputs, each video signal input being transmitted from an input source device of a plurality of input source devices;
 a reading step of reading information through a reading channel, the information (i) indicating a physical address of a main device, the physical address of the main device being generated by an output destination device and including information indicating a physical address of the output destination device, and (ii) indicating a status of the output destination device that is an output destination of the video signal, and the reading channel being for reading the information from the output destination device;
 a storing step of storing the information read in said reading step into a memory;
 a read-out step of reading out the information stored in the memory;
 an outputting step of outputting the information indicating the status of output destination device (i) through a read-out channel of a plurality of read-out channels for outputting the information to the plurality of input source devices, each read-out channel of the plurality of read-out channels corresponding to a respective input source device of the plurality of input source devices, the read-out channel through which the information is output corresponding to the input source device transmitting the video signal selected by said selecting step, and (ii) to the input source device transmitting the video signal selected by said selecting step; and an address generating step of generating a respective physical address of each input source device of the plurality of input source devices, each respective physical address including information indicating the physical address of the main device, wherein said outputting step includes outputting, to each respective input source device of the plurality of input source devices, the respective physical address of the input source device including the information indicating the physical address of the main device generated by said address generating step, such that each respective physical address corresponds to an input source device of the plurality of input source devices.

12. A signal switching device comprising:

a plurality of control signal transmission lines for transmitting a device control signal between an output destination device that is an output destination of a video signal and a plurality of input source devices;

a selecting unit operable to select a video signal from a plurality of video signal inputs, each video signal input being transmitted from an input source device of the plurality of input source devices;

a memory for storing information;

a reading channel for reading the information from the output destination device that is the output destination of the video signal;

a reading unit operable to read the information through said reading channel, the information (i) indicating a physical address of said signal switching device, the physical address of said signal switching device being generated by the output destination device and including information indicating a physical address of the output destination device, and (ii) indicating a status of the output destination device;

a storing unit operable to store the information read by said reading unit into said memory;

a read-out unit operable to read out the information stored in said memory;

a plurality of read-out channels for outputting the information to the plurality of input source devices, each read-out channel of said plurality of read-out channels corresponding to a respective input source device of the plurality of input source devices;

an outputting unit operable to output the information indicating the status of the output destination device through a read-out channel of the plurality of read-out channels to a respective input source device; and an address setup unit operable to generate a respective physical address of each input source device of the plurality of input source devices, each respective physical address including information indicating the physical address of said signal switching device, wherein said outputting unit is operable to output, to each respective input source device of the plurality of input source devices, the respective physical address of the input source device including the information indicating the physical address of said signal switching device generated by said address setup unit, such that each respective physical address corresponds to an input source device of the plurality of input source devices, and wherein said selecting unit is operable to select the video signal of the plurality of video input signals according to the device control signal transmitted, via said plurality of control signal transmission lines, from the input source device that received the information indicating the status of the output destination device.

13. The signal switching device according to claim 12, wherein said outputting unit is operable to output the information indicating the status of the output destination device through a read-out channel, of said plurality of read-out channels, that corresponds to the input source device transmitting the video signal selected by said selecting unit.

14. The signal switching device according to claim 12, wherein said outputting unit is operable to output the information indicating the status of the output destination device only through said read-out channel that corresponds to the video signal selected by said selecting unit.

15. The signal switching device according to claim 14 wherein said selecting unit is operable to select a video signal that corresponds to the physical address of an input source device of the plurality of input source devices.

16. The signal switching device according to claim 12 further comprising:

a voltage detecting unit operable to detect a voltage status of each control signal transmission line of said plurality of control signal transmission lines; and a power status control unit operable to change a status of a power supply of said signal switching device depending on the detected voltage status obtained by said voltage detecting unit.

17. The signal switching device according to claim 16, wherein said power status control unit is operable to turn on the power supply of said signal switching device when a pull-up of a control signal transmission line of said plurality of control signal transmission lines is detected by said voltage detecting unit.

18. The signal switching device according to claim 16, wherein said power status control unit is operable to turn off the power supply of said signal switching device when the detected voltage status of a control signal transmission line of said plurality of control signal transmission lines is decreased to a ground voltage.

19. The signal switching device according to claim 1 further comprising a power supply control unit operable to control a power supply to all of or part of the output destination device and the respective input source devices depending on whether or not each respective control signal transmission line of said plurality of control signal transmission lines is used.

20. The signal switching device according to claim 19, wherein said power supply control unit is operable to supply power when a message, being the device control signal, is transmitted to a respective control signal transmission line.

21. The signal switching device according to claim 19, wherein said power supply control unit is operable to stop a power supply when a respective control signal transmission line is not used.

22. The signal switching device according to claim 1, wherein said selecting unit is operable to select a video signal generated by the input source device that has received the information indicating the status of the output destination device, the video signal being generated based on the received information.

* * * * *